US008296742B2

(12) United States Patent
Biswas et al.

(10) Patent No.: US 8,296,742 B2
(45) Date of Patent: Oct. 23, 2012

(54) AUTOMATIC NATIVE GENERATION

(75) Inventors: Surupa Biswas, Redmond, WA (US); Ori Gershony, Redmond, WA (US); Jan Kotas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1779 days.

(21) Appl. No.: 11/545,948

(22) Filed: Oct. 10, 2006

(65) Prior Publication Data
US 2008/0098368 A1  Apr. 24, 2008

(51) Int. Cl.
G06F 9/45  (2006.01)

(52) U.S. Cl. .......................... 717/136; 717/140; 717/146

(58) Field of Classification Search ......................... None
See application file for complete search history.

(56) References Cited

U.S. PATENT DOCUMENTS

| | | | |
|---|---|---|---|
| 6,110,226 A | 8/2000 | Bothner | |
| 6,151,703 A | 11/2000 | Crelier | |
| 6,289,506 B1 | 9/2001 | Kwong et al. | |
| 6,484,313 B1 | 11/2002 | Trowbridge et al. | |
| 6,760,907 B2 | 7/2004 | Shaylor | |
| 6,964,039 B2 | 11/2005 | Heeb | |
| 6,978,451 B2 | 12/2005 | Heeb | |
| 7,171,655 B2 * | 1/2007 | Gordon et al. | 717/146 |
| 7,730,468 B1 * | 6/2010 | Trowbridge | 717/148 |
| 2002/0144240 A1 * | 10/2002 | Lueh et al. | 717/136 |
| 2003/0084432 A1 | 5/2003 | Kobayashi | |
| 2004/0083467 A1 * | 4/2004 | Hanley et al. | 717/148 |
| 2004/0123278 A1 | 6/2004 | Nanja et al. | |
| 2004/0158813 A1 * | 8/2004 | Xia et al. | 717/116 |
| 2004/0255268 A1 * | 12/2004 | Meijer et al. | 717/106 |
| 2005/0065936 A1 * | 3/2005 | Goering | 707/100 |
| 2005/0108692 A1 * | 5/2005 | Lau et al. | 717/136 |
| 2005/0273769 A1 * | 12/2005 | Eichenberger et al. | 717/136 |
| 2006/0101438 A1 | 5/2006 | Mariani | |
| 2006/0101446 A1 | 5/2006 | Mariani et al. | |
| 2006/0136712 A1 * | 6/2006 | Nagendra et al. | 713/150 |
| 2007/0061787 A1 * | 3/2007 | Trowbridge | 717/140 |
| 2007/0226715 A1 * | 9/2007 | Kimura et al. | 717/148 |
| 2007/0245324 A1 * | 10/2007 | Inglis et al. | 717/140 |

(Continued)

FOREIGN PATENT DOCUMENTS

EP  0997816 A2  5/2000

OTHER PUBLICATIONS

Vaswani et al. Dynamic recompilation and profile-guided optimisations for a .NET JIT compiler. IEEE Proceedings—Software, Oct. 2003, p. 296-302, Retrieved on [Jul. 23, 2012], Retrieved from the Internet: URL<http://ieeexplore.ieee.org/stamp/stamp.jsp?tp=&arnumber=1249340>.*

(Continued)

Primary Examiner — Thuy Dao
Assistant Examiner — Cheneca Smith

(57) ABSTRACT

Various technologies and techniques are disclosed for automatically generating native images for a virtual machine environment. A virtual machine environment is provided where application libraries are distributed in an intermediate language format and then compiled at a later point in time. An automatic native generation service is provided that monitors the application libraries and generates a native image for a particular one or more of the application libraries when the service determines that native generation is appropriate. Invalid native images are automatically detected and re-generated. If a load attempt for a particular native image is unsuccessful, then the native image is determined to be invalid. The particular native image is then re-generated automatically.

11 Claims, 8 Drawing Sheets

U.S. PATENT DOCUMENTS

2007/0294679 A1* 12/2007 Bobrovsky et al. ............ 717/146

OTHER PUBLICATIONS

Arnold et al, Architecture and policy for adaptive optimization in virtual machines, Nov. 2004, Retrieved on [Jul. 23, 2012] Retrieved from the Internet: URL<http://researchweb.watson.ibm.com/people/h/hind/RC23429.pdf>.*

Reid Wilkes, "SPEED: NGen Revs Up Your Performance with Powerful New Features", MSDN Magazine, Apr. 2005. http://msdn.microsoft.com/msdnmag/issues/05/04/NGen/default.aspx.

"International Search Report", PCT/US2007/080451, Jan. 21, 2008, pp. 1-12.

Arnold, Matthew et al., "A Survey of Adaptive Optimization in Virtual Machines", pp. 449-466, Proceedings of the IEEE, vol. 93, No. 2, Feb. 2005.

Arnold, Matthew et al, "A Survey of Adaptive Optimization in Virtual Machines", 41 pages, IBM Research Report, updated May 18, 2004.

"International Search Report", Mailed Jan. 21, 2008, Application No. PCT/US2007/080451, Filed Date Oct. 4, 2007, pp. 1-12.

"EP Search Report", Mailed Nov. 2, 2009, Application No. PCT/US2007/080451, EP Application No. EP 07843842.1, pp. 1-11.

Reid, Wilkes, "SPEED: NGen Revs Up Your Performance with Powerful New Features", Retrieved at << http://msdn.microsoft.com/msdnmag/issues/05/04/NGen/default.aspx >>, MSDN Magazine, Apr. 2005, pp. 11.

Reid, Wilkes, "SPEED: NGen Revs Up Your Performance with Powerful New Features", Retrieved at << http://msdn.microsoft.com/en-us/magazine/cc163808(printer).aspx >>, MSDN Magazine, Apr. 2005, pp. 1-10.

". NET Framework Conceptual Overview", Retrieved at << http://msdn.microsoft.com/en-us/library/zw4w595w(VS.80,printer).aspx>>, MSDN, Microsoft Corporation, Retrieved Date Oct. 21, 2009, pp. 1-5. ".NET Framework 2.0", Retrieved at << http://msdn.microsoft.com/en-us/library/bb966997(VS.80, printer).aspx>>, MSDN, Microsoft Corporation, Retrieved Date Oct. 21, 2009, pp. 1.

". NET Framework Programming", Retrieved at << http://msdn.microsoft.com/en-us/library/ms229284(VS.80, printer).

Cierniak, et al., "Briki: an Optimizing Java Compiler," Date: 1997, p. 179-184, http://ieeexplore.ieee.org/application/enterprise/entfilecabinet.jsp?ResultStart=0.

Hsieh, et al., "Java Bytecode to Native Code Translation: The Caffeine Prototype and Preliminary Results," Date: 1996, p. 90-97, http://delivery.acm.org/10.1145/250000/243864/p90-hsieh.pdf?key1=243864&key2=0155226511&coll=GUIDE&dl=GUIDE&CFID=660025&CFTOKEN=20788419pdf.

Joisha, et al., "A Framework for Efficient Reuse of Binary Code in Java," Date: 2001, p. 440-453, http://delivery.acm.org/10.1145/380000/377902/p440-joisha.pdf?key1=377902&key2=5424226511&coll=GUIDE&dl=GUIDE&CFID=659270&CFTOKEN=68847446.

EP Application 07 843 842.1, Office Action mailed Feb. 10, 2010, 8 pages.

EP Application 07 843 842.1, Response to Office Action mailed Jun. 18, 2010, 16 pages.

* cited by examiner

AUTOMATIC NATIVE GENERATION

BACKGROUND

Many applications and libraries are distributed in an intermediate format, such as MICROSOFT® Intermediate Language (MSIL). These intermediate language binaries (also known as managed assemblies in the case of MICROSOFT®.NET) are typically compiled dynamically at runtime in a virtual machine environment using a Just-in-Time (JIT) compiler. An alternative to dynamic compilation is pre-compilation via Native Generation (NGen). NGen generates machine code and runtime data structures from the intermediate language and persists them in files on disk. The images produced by NGen are called Native or NGen images. Unlike JIT-compiled code, code and data structures in NGen images can be shared across processes. For libraries and frameworks that are typically shared across multiple processes, NGen is extremely useful since it minimizes the working set of each managed process. NGen therefore reduces the overall memory utilization of the system. NGen is also very useful for minimizing start up time of client-side applications.

Several managed platforms/applications are using NGen. Unfortunately, however, it is quite difficult to use NGen in these current platforms. Since NGen images need to be created on the end-user machine, NGen commands need to be chained through the framework/application's installer. Typically, that involves writing a custom action (such as a MIROSOFT® WINDOWS® Installer action) that invokes a command-line tool (ngen.exe in the case of MICROSOFT® .NET).Custom actions are not trivial to write. Moreover, NGen images may become invalidated for a variety of reasons (such as when the corresponding libraries/assemblies are serviced), and need to be regenerated each time that happens by issuing explicit commands through the command line tool.

SUMMARY

Various technologies and techniques are disclosed for automatically generating native images for a virtual machine environment. A virtual machine environment is provided where application libraries are distributed in an intermediate language format and then compiled at a later point in time. An automatic native generation service is provided that monitors the application libraries and generates a native image for a particular one or more of the application libraries when the service determines that native generation is appropriate.

In one implementation, native generation is determined to be appropriate by monitoring how frequently a particular application library is used, and then regenerating the application libraries in order of frequency of usage. In another implementation, native generation is determined to be appropriate by reading an identifier associated with a particular application library indicating it has been opted into native generation.

Invalid native images are automatically detected and re-generated. For example, if a load attempt for a particular native image is unsuccessful, then the native image is determined to be invalid. The particular native image is then regenerated automatically.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
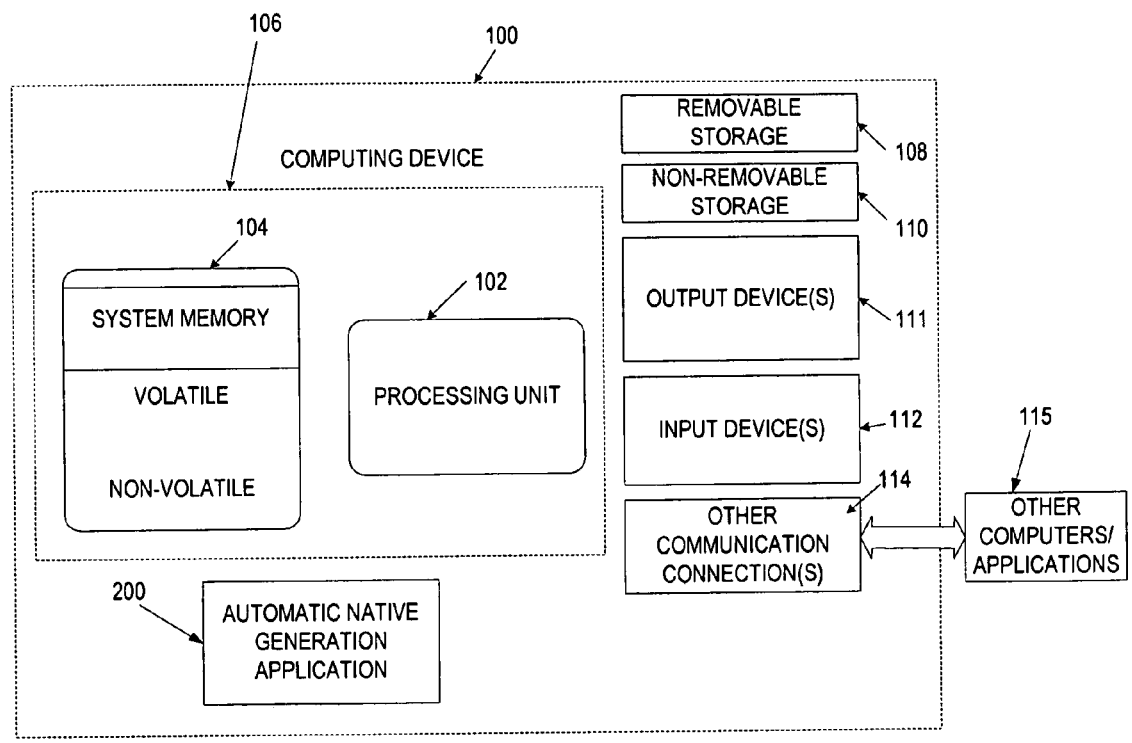
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that automatically generates native images (NGen images) in a virtual machine environment, but the system also serves other purposes in addition to these. In one implementation, one or more of the techniques described herein can be implemented as features within a framework program such as MICROSOFT® .NET Framework, Java Virtual Machine, or from any other type of program or service that deals with an intermediate language and then needs to compile that intermediate language into machine code for execution on a target machine.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes automatic native generation application 200. Automatic native generation application 200 will be described in further detail in FIG. 2.

Figure 2:
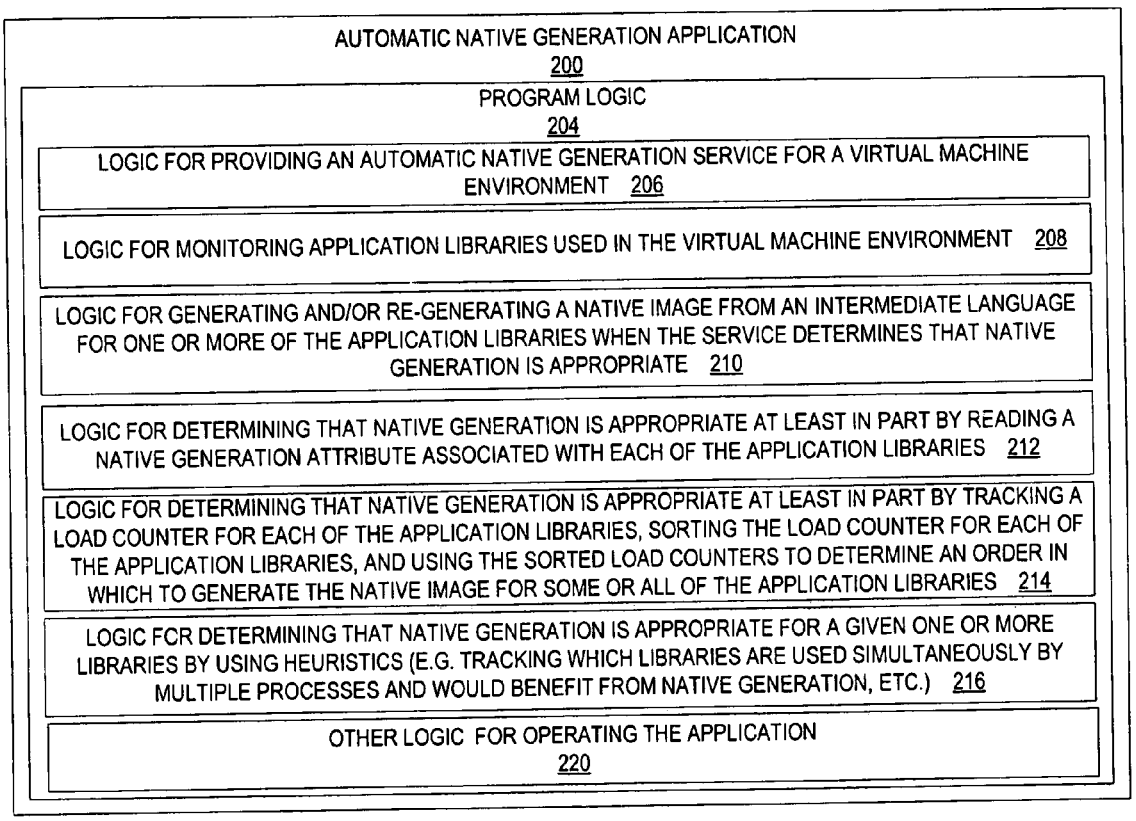
FIG. 2 is a diagrammatic view of an automatic native generation application of one implementation operating on the computer system of FIG. 1.

Turning now to FIG. 2 with continued reference to FIG. 1, an automatic native generation application 200 operating on computing device 100 is illustrated. Automatic native generation application 200 is one of the application programs that reside on computing device 100. However, it will be understood that automatic native generation application 200 can alternatively or additionally be embodied as computer-executable instructions on one or more computers and/or in different variations than shown on FIG. 1. Alternatively or additionally, one or more parts of automatic native generation application 200 can be part of system memory 104, on other computers and/or applications 115, or other such variations as would occur to one in the computer software art.

Automatic native generation application 200 includes program logic 204, which is responsible for carrying out some or all of the techniques described herein. Program logic 204 includes logic for providing an automatic native generation service for a virtual machine environment 206; logic for monitoring application libraries used in the virtual machine environment 208; logic for generating and/or re-generating a native image from an intermediate language for one or more of the application libraries when the service determines that native generation is appropriate 210; logic for determining that native generation is appropriate at least in part by reading a native generation attribute associated with each of the application libraries 212; logic for determining that native generation is appropriate at least in part by tracking a load counter for each of the application libraries, sorting the load counter for each of the application libraries, and using the sorted load counters to determine an order in which to generate the native image for some or all of the application libraries 214; logic for determining that native generation is appropriate for a given one or more libraries by using heuristics (e.g. tracking which libraries are used simultaneously by multiple processes and would benefit from native generation, etc.) 216; and other logic for operating the application 220. In one implementation, program logic 204 is operable to be called programmatically from another program, such as using a single call to a procedure in program logic 204.

Figure 3:
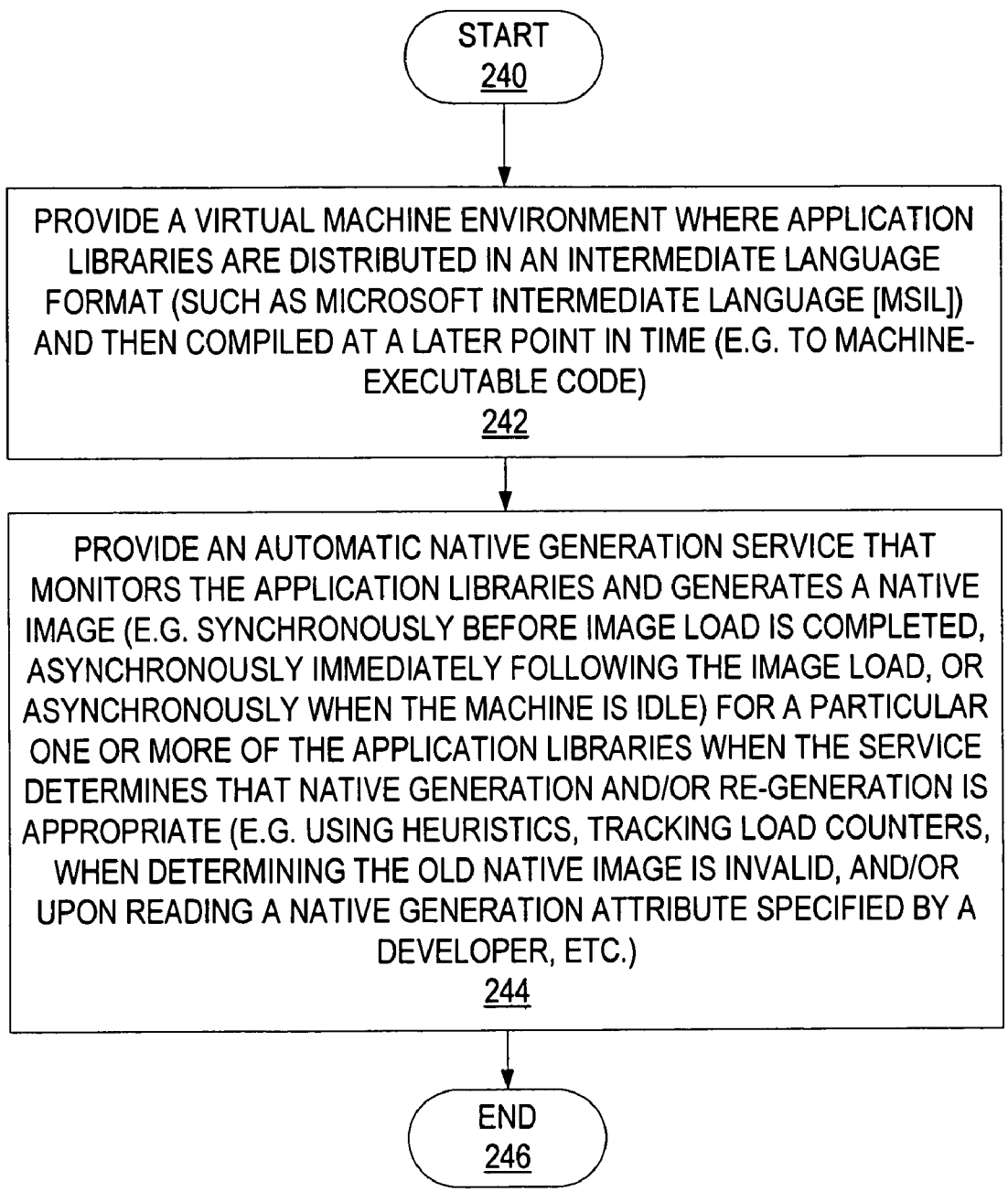
FIG. 3 is a high-level process flow diagram for one implementation of the system of FIG. 1.

Turning now to FIGS. 3-8 with continued reference to FIGS. 1-2, the stages for implementing one or more implementations of automatic native generation application 200 are described in further detail. FIG. 3 is a high level process flow diagram for automatic native generation application 200. In one form, the process of FIG. 3 is at least partially implemented in the operating logic of computing device 100. The procedure begins at start point 240 with providing a virtual machine environment where application libraries are distributed in an intermediate language format (such as MICROSOFT® intermediate language [MSIL]) and then compiled at a later point in time (e.g. to machine-executable code) (stage 242). The term application library as used herein is meant to include code libraries that can be compiled into machine code and executed and/or accessed by a computer as a dynamic link library (DLL), executable program (EXE), and/or another type of program or library.

An automatic native generation service is provided that monitors the application libraries and generates a native image (e.g. synchronously before image load is completed, asynchronously immediately following the image load, or asynchronously when the machine is idle) for a particular one or more of the application libraries when the service determines that native generation and/or re-generation is appropriate (stage 244). One or more combinations of heuristics, tracking load counters, determining the old native image is invalid, reading a native generation attribute specified by a developer, and/or other rules of logic can be used to determine that native generation is appropriate (stage 244). As one non-limiting example, a developer can set a native generation attribute for a particular library/assembly, and the system can then read that attribute to determine that the developer wishes to opt-in to native generation. Some additional non-limiting examples are described in further detail in FIGS. 4-6. The process ends at end point 246.

Figure 4:
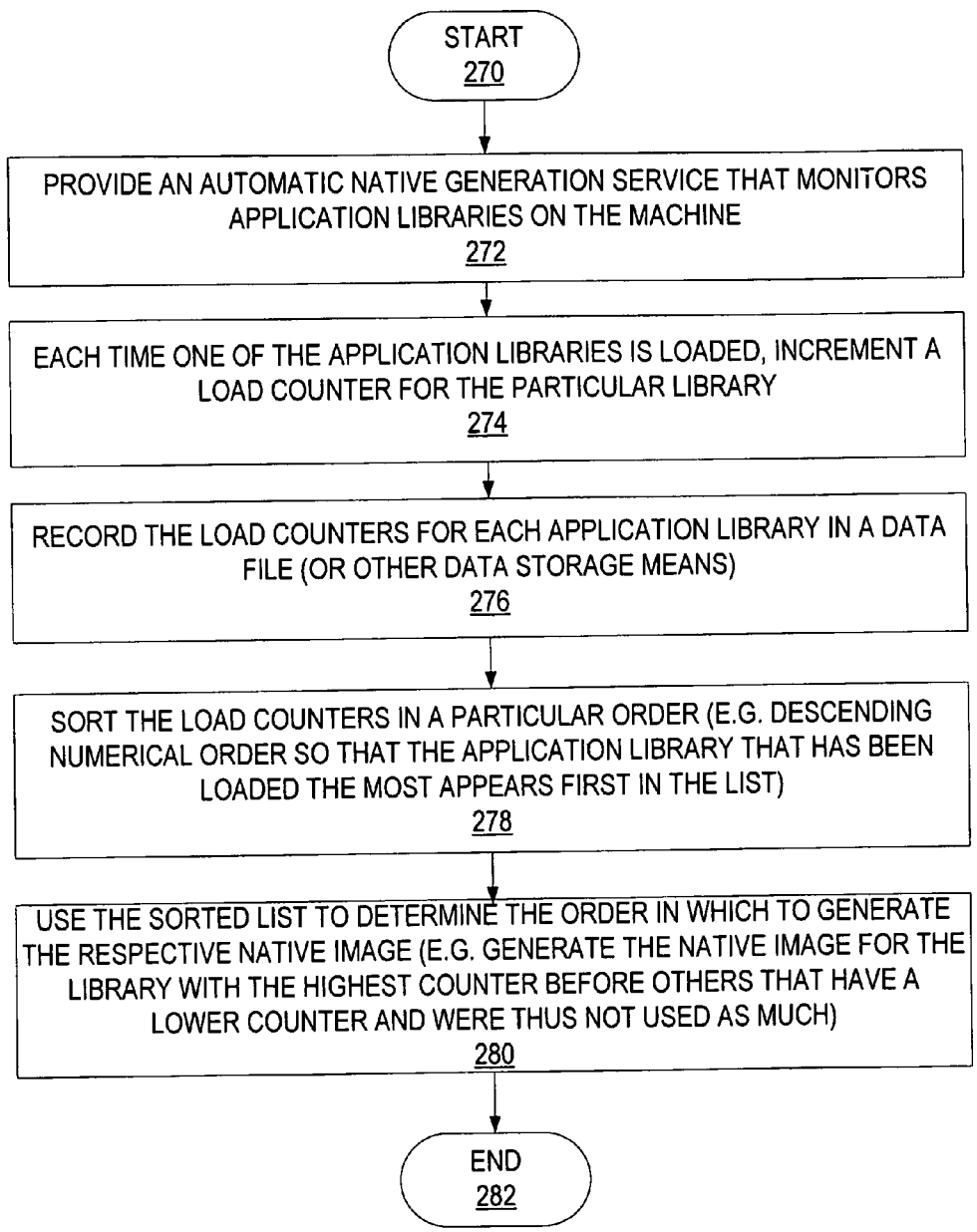
FIG. 4 is a process flow diagram for one implementation of the system of FIG. 1 illustrating the stages involved in providing an automatic native generation service that uses load counters to determine an order to generate the native images.

FIG. 4 illustrates one implementation of the stages involved in providing an automatic native generation service that uses load counters to determine an order to generate the native images. In one form, the process of FIG. 4 is at least partially implemented in the operating logic of computing device 100. One or more combinations of load counters can be used instead of or in addition to the other techniques described herein for determining when automatic native generation is appropriate. The procedure begins at start point 270 with providing an automatic native generation service that monitors application libraries on the machine (stage 272). Each time one of the application libraries is loaded, a load counter is incremented for the particular library to indicate it has been loaded again (stage 274). The load counter for each application library is recorded in a data file (or other data storage means) (stage 276). The load counters are sorted in a particular order (e.g. descending numerical order so that the application library that has been loaded the most appears first in the list) (stage 278). The sorted list is then used to determine the order in which to generate the respective native image (stage 280). In one implementation, the native image for the library with the highest counter is generated before others that have a lower counter and were thus not used as much (stage 280). The process ends at end point 282.

Figure 5:
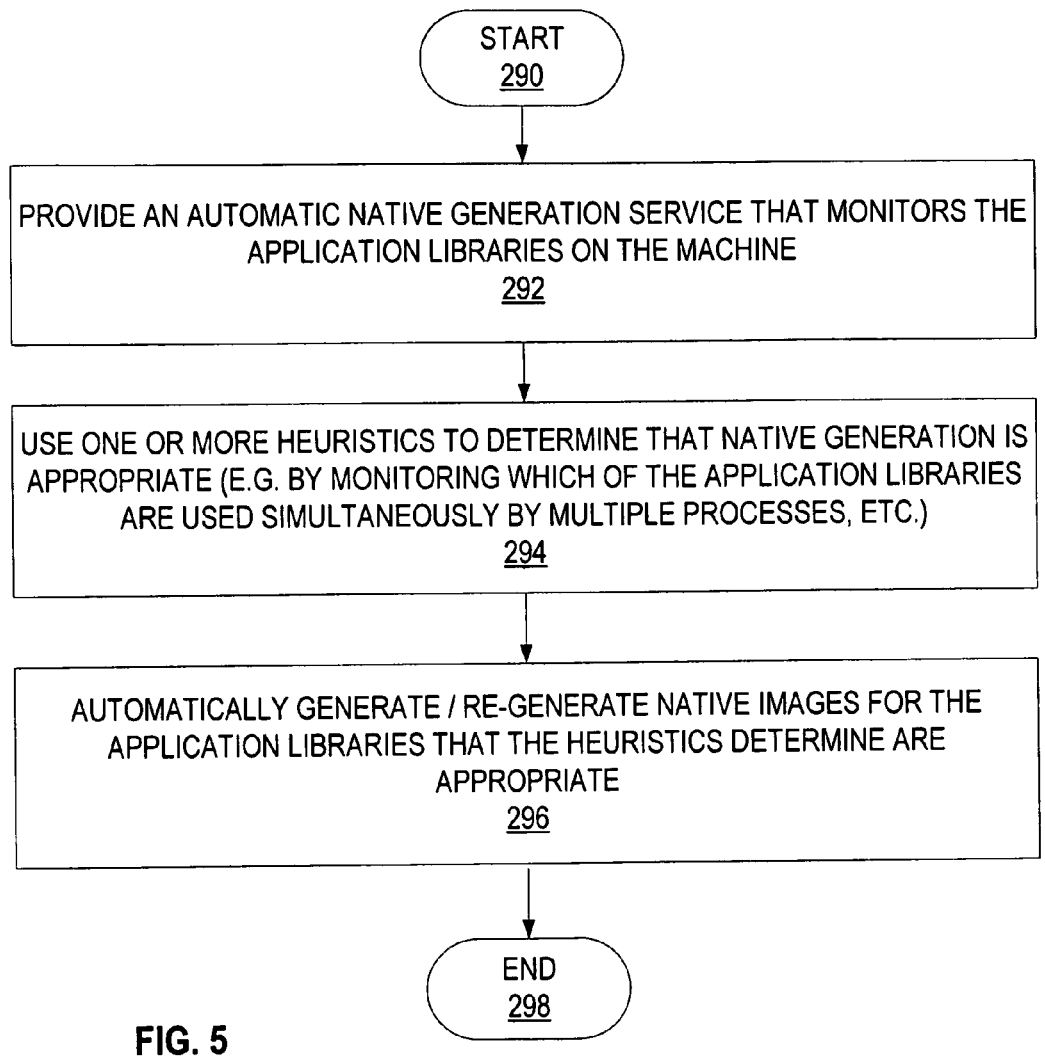
FIG. 5 is a process flow diagram for one implementation of the system of FIG. 1 illustrating the stages involved in providing an automatic native generation service that uses heuristics to help determine which native images to generate.

FIG. 5 illustrates one implementation of the stages involved in providing an automatic native generation service that uses heuristics to help determine which native images to generate. One or more combinations of heuristics can be used instead of or in addition to the other techniques described herein for determining when automatic native generation is appropriate. In one form, the process of FIG. 5 is at least partially implemented in the operating logic of computing device 100. The procedure begins at start point 290 with providing an automatic native generation service that monitors the application libraries on the machine (stage 292). One or more heuristics are used to determine that native generation is appropriate (stage 294). In one implementation, one heuristic includes monitoring which of the application libraries are used simultaneously by multiple processes (and would thus benefit from native image generation) (stage 294). The system automatically generates/re-generates native images for the application libraries that the heuristics determine are appropriate (stage 296). The process ends at end point 298.

Figure 6:
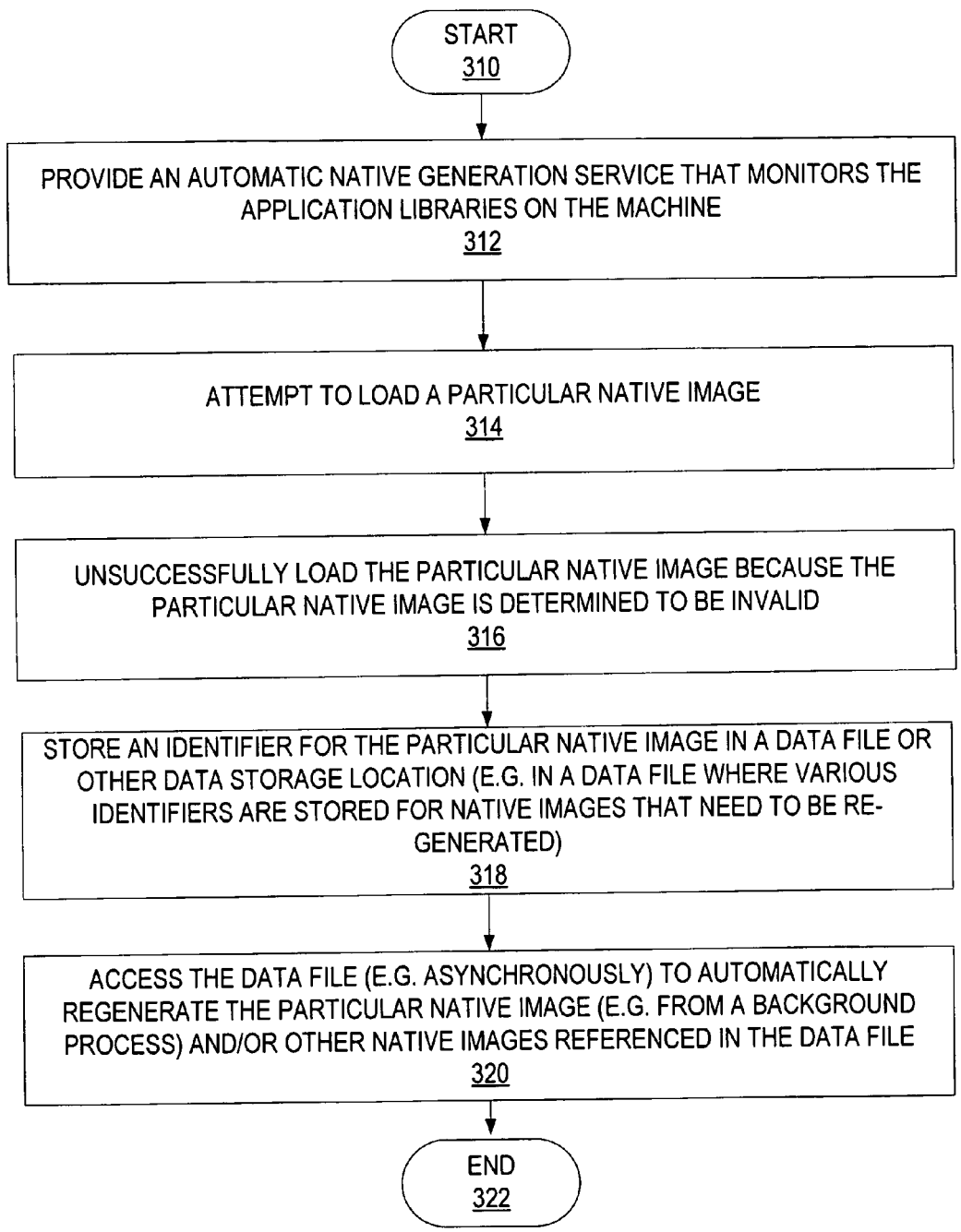
FIG. 6 is a process flow diagram for one implementation of the system of FIG. 1 illustrating the stages involved in providing an automatic native generation service that automatically re-generates native images that are determined to be invalid.

FIG. 6 illustrates one implementation of the stages involved in providing an automatic native generation service that automatically re-generates native images that are determined to be invalid. One or more combinations of re-generation techniques for invalid native images can be used instead of or in addition to the other techniques described herein for determining when automatic native generation is appropriate. In one form, the process of FIG. 6 is at least partially implemented in the operating logic of computing device 100. The procedure begins at start point 310 with providing an automatic native generation service that monitors the application libraries on the machine (stage 312). The system attempts to load a particular native image (stage 314), and after unsuccessfully loading the particular native image, determines that the particular native image is invalid (stage 316). An identifier is then stored for the particular native image in a data file or other data storage location (e.g. in a data file where various identifiers are stored for native images that need to be re-generated) (stage 318). The data file is accessed (e.g. asynchronously) to automatically re-generate the particular native image (e.g. from a background process) (stage 320). Other native images referenced in the data file can also be re-generated at this or a later time (stage 320). The process ends at end point 322.

Figure 7:
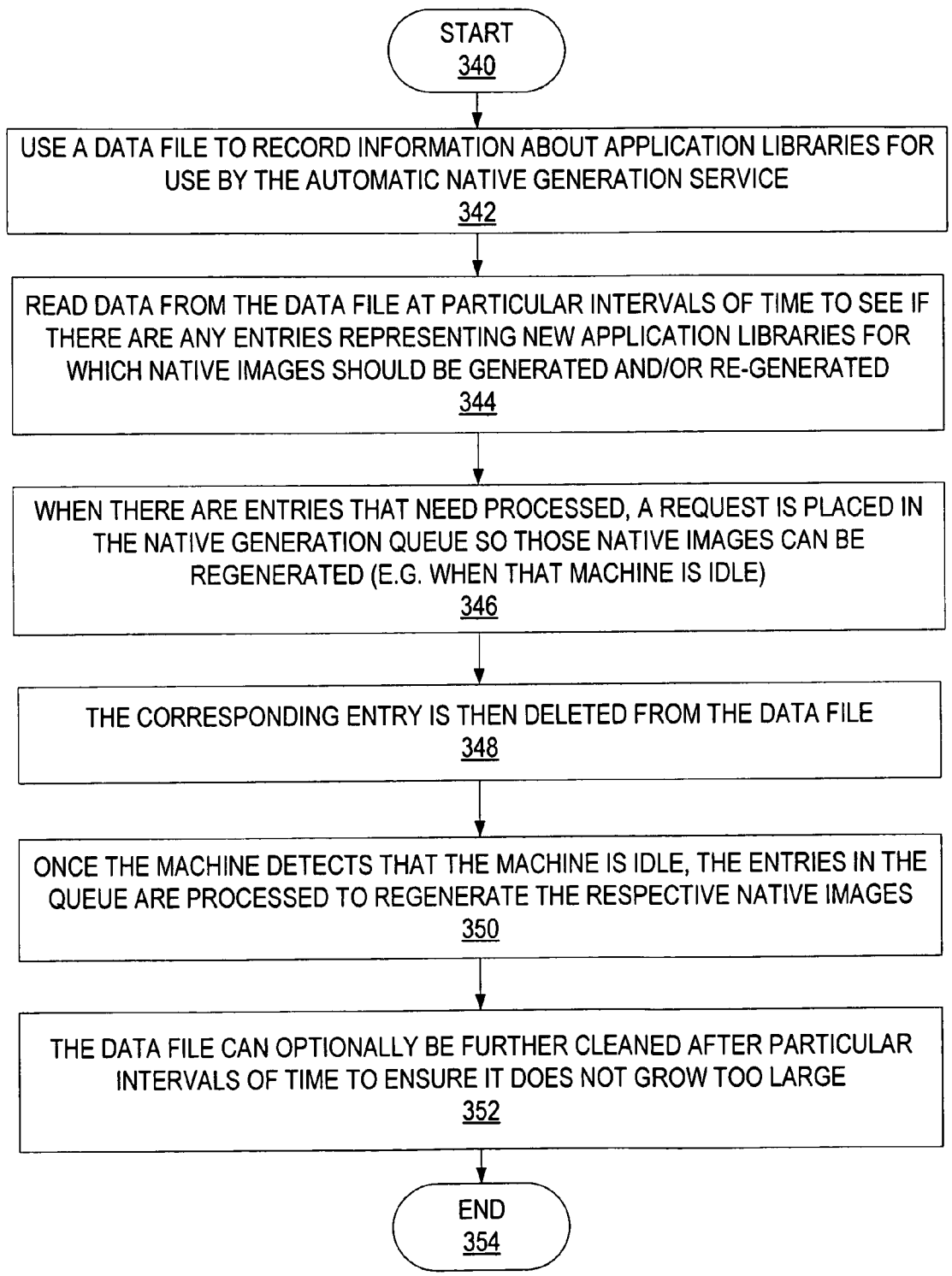
FIG. 7 is a process flow diagram for one implementation of the system of FIG. 1 that illustrates the stages involved in managing and interacting with a data file to help track which native images should be generated by the native generation service.

FIG. 7 illustrates one implementation of the stages involved in managing and interacting with a data file to help track which native images should be generated by the native generation service. In one form, the process of FIG. 7 is at least partially implemented in the operating logic of computing device 100. The procedure begins at start point 340 with using a data file to record information about application libraries for use by the automatic native generation service (stage 342). Data is read from the data file at particular intervals of time to see if there are any entries representing new application libraries for which native images should be generated and/or re-generated (stage 344). When there are entries that need to be processed, a request is placed in the native generation queue so those native images can be regenerated (e.g. when that machine is idle) (stage 346). The corresponding entry is then deleted from the data file (stage 348). Once the machine detects that the machine is idle, the entries in the queue are processed to regenerate the respective native images (stage 350). The data file can optionally be further cleaned after particular intervals of time to ensure it does not grow too large (stage 352). The process ends at end point 354.

Figure 8:
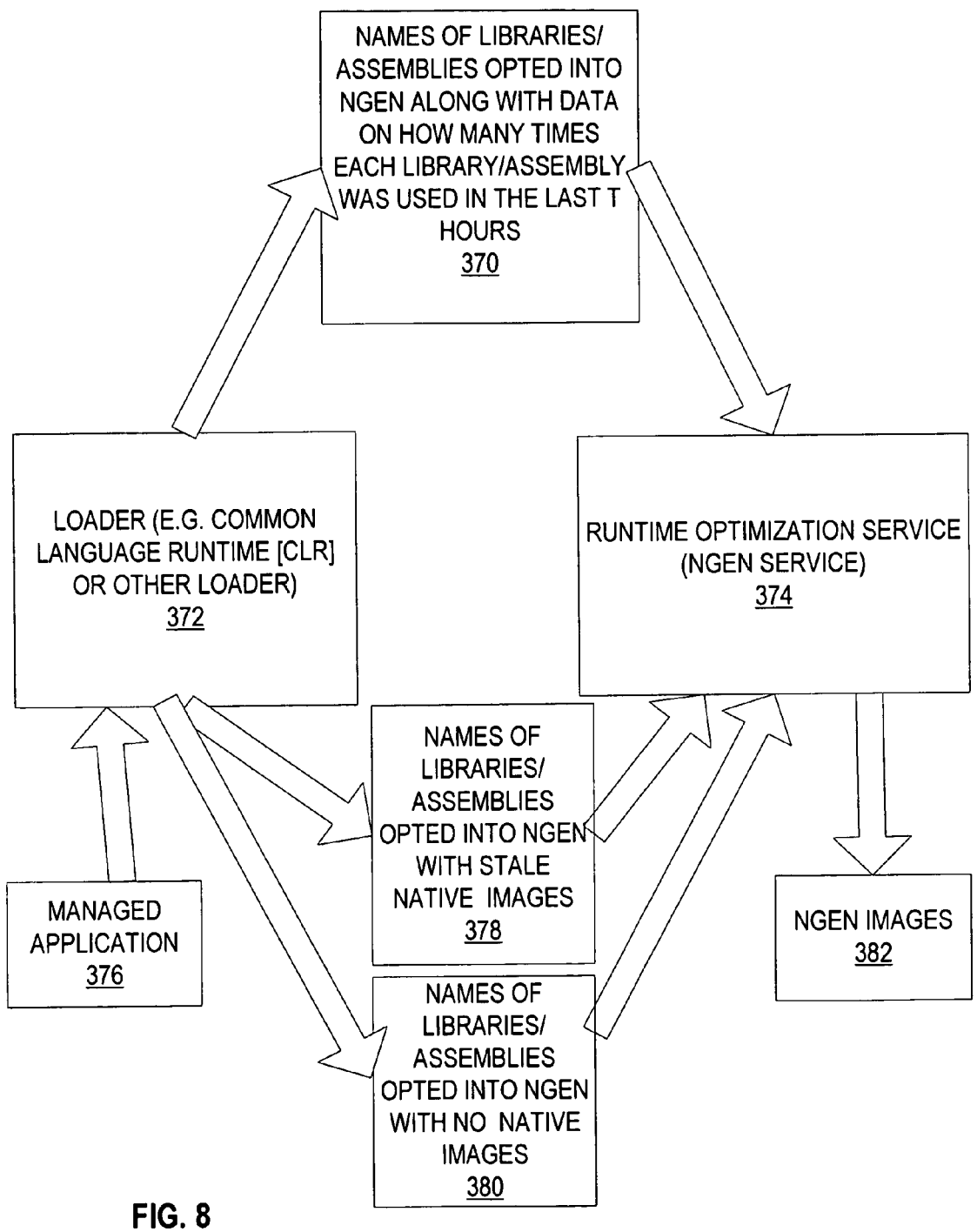
FIG. 8 is a logical diagram for one implementation of the system of FIG. 1 that illustrates the interaction of various libraries and/or subsystems during an automatic native generation process.

FIG. 8 is a logical diagram for one implementation of the system of FIG. 1 that illustrates the interaction of various libraries and/or subsystems during an automatic native generation process. In one form, the process of FIG. 8 is at least partially implemented in the operating logic of computing device 100. The names of libraries/assemblies that have opted into native generation along with data on how many times each library/assembly was used in the last T hours are stored (370). A loader (372), such as a MICROSOFT® Common Language Runtime (CLR) loader, or another loader can access this usage data (370). This loader (372) interacts with managed application (376). The usage data (370), along with the names of libraries/assemblies that have opted into the native generation service that have stale native images (378) and that have no native images (380) are provided to a runtime optimization service (374). The runtime optimization service (374) then generates the native images (NGen images) (382).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for automatically generating native images for a virtual machine comprising the steps of:
   providing a virtual machine environment where a plurality of application libraries are distributed in an intermediate language format and then compiled at a later point in time; and
   providing an automatic native generation service, the service being operable to monitor the plurality of application libraries, and to generate a native image for a particular one or more of the application libraries when the service determines that native generation is appropriate, wherein the automatic native generation service monitors the plurality of application libraries by incrementing a respective counter each time a respective one of the application libraries is loaded, and wherein the automatic native generation service uses the respective counter for each of the respective application libraries to determine an order in which to generate a respective native image by sorting the respective counter for each of the application libraries in descending numerical order so that the application library that has been loaded the most appears first in a list of sorted counters, wherein the service determines that native generation is appropriate by using heuristics, wherein the heuristics used to determine that native generation is appropriate includes monitoring which of the plurality of application libraries are used simultaneously by multiple processes.

2. The method of claim 1, wherein the automatic native generation service runs asynchronously.

3. The method of claim 1, wherein the automatic native generation service runs when a machine is idle.

4. The method of claim 1, wherein the automatic native generation service is further operable to regenerate the native image for the particular one or more of the application libraries when the service determines the native image is invalid.

5. The method of claim 1, wherein each of the respective counters are sorted in a descending order, and wherein the descending order is used to determine an order in which to generate the respective native image.

6. The method of claim 5, wherein a particular application library having a highest respective counter will have the respective native image generated first.

7. The method of claim 1, wherein the intermediate language is Microsoft Intermediate Language.

8. A computer storage memory having computer-executable instructions for causing a computer to perform the steps recited in claim 1.

9. A computer storage memory having computer-executable instructions for causing a computer to perform steps comprising:

provide an automatic native generation service for a virtual machine environment, the service being operable to monitor a plurality of application libraries, and to generate a native image from an intermediate language for a particular one or more of the application libraries when the service determines that native generation is appropriate, wherein the native generation service is further operable to determine that native generation is appropriate at least in part by tracking a load counter for each of the application libraries, sorting the load counter for each of the application libraries in descending numerical order so that the application library that has been loaded the most appears first in a list of sorted load counters, and then using the list of sorted load counters to determine an order in which to generate the native image for some or all of the application libraries, wherein the native generation service is further operable to determine that native generation is appropriate at least in part by reading a native generation attribute associated with each of the application libraries, the native generation attribute specified by a developer to opt-in to native generation.

10. The computer storage memory of claim 9, wherein the native generation service is further operable to generate the native image asynchronously.

11. The computer storage memory of claim 9, wherein the native generation service is further operable to determine that native generation is appropriate at least in part by using heuristics.

* * * * *